Oct. 1, 1963

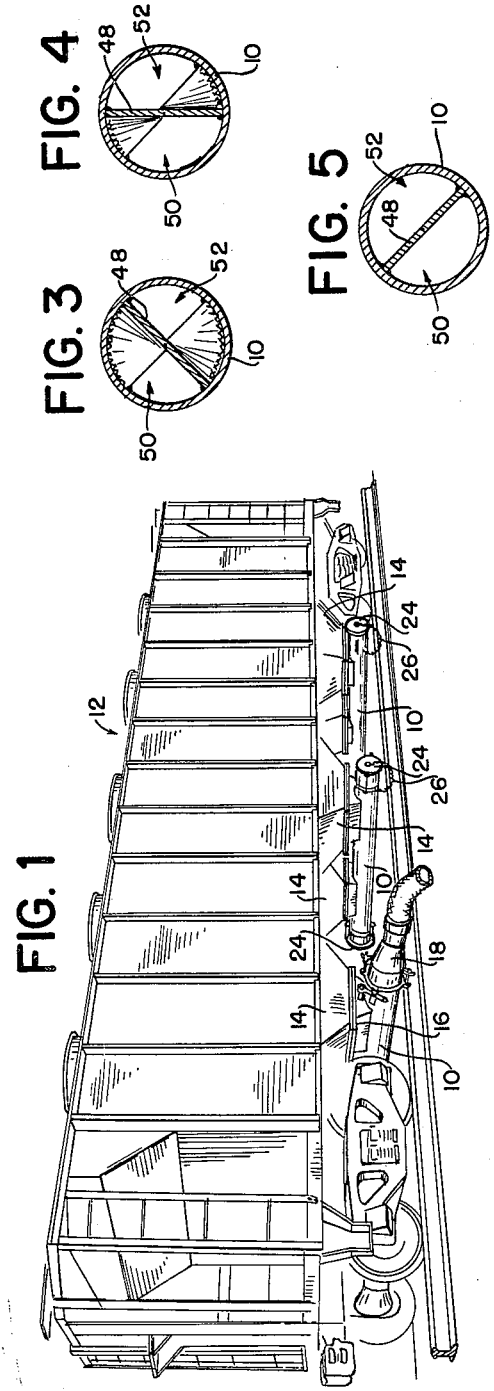

R. C. COLLINS ETAL 3,105,721

HOPPER CAR

Filed Aug. 29, 1960

INVENTORS
ROBERT C. COLLINS
CONSTANTINE A. MICHALOS
BY
Robert G. Shields
ATTORNEY Oct. 1, 1963
R. C. COLLINS ETAL
3,105,721
HOPPER CAR
Filed Aug. 29, 1960
4 Sheets-Sheet 3
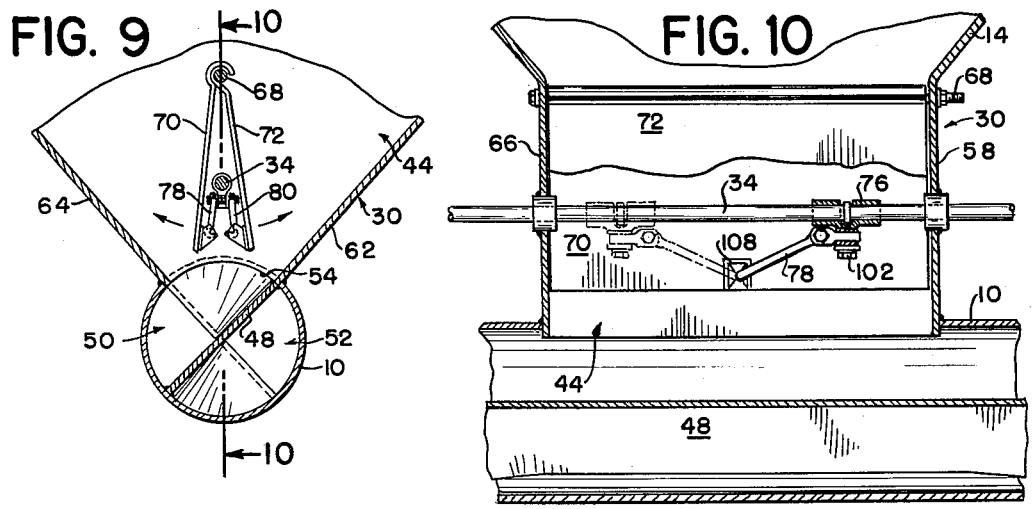
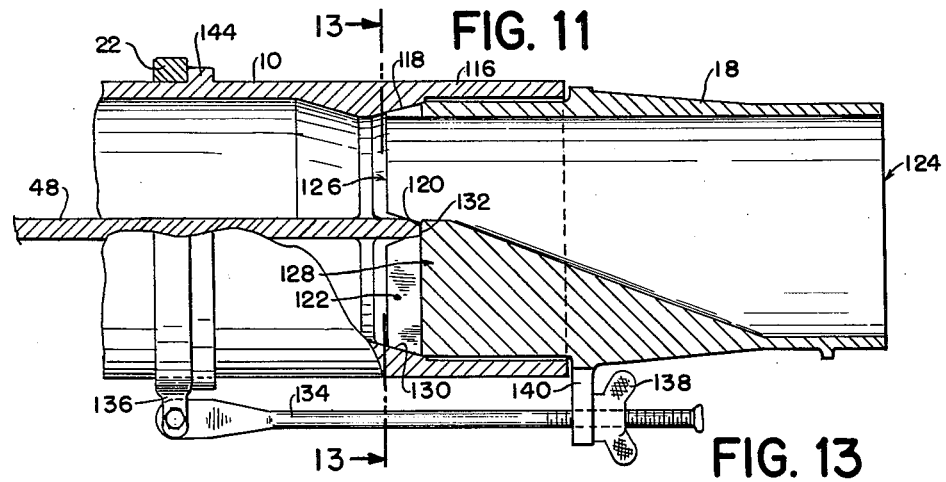
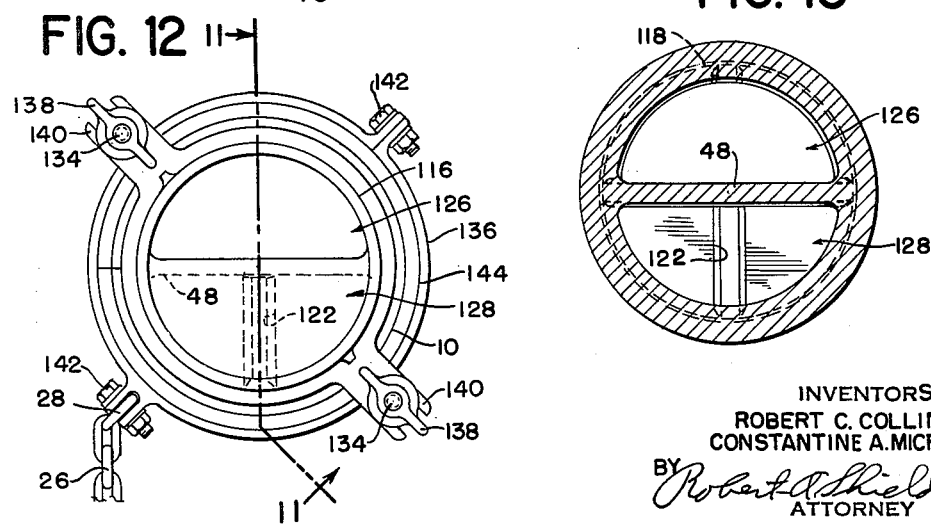
INVENTORS
ROBERT C. COLLINS
CONSTANTINE A. MICHALOS
BY *Robert A. Shield*
ATTORNEY Oct. 1, 1963   R. C. COLLINS ETAL   3,105,721
HOPPER CAR
Filed Aug. 29, 1960   4 Sheets-Sheet 4

INVENTORS
ROBERT C. COLLINS
CONSTANTINE A. MICHALOS
BY *Robert A. Shield*
ATTORNEY

United States Patent Office 3,105,721
Patented Oct. 1, 1963

3,105,721
HOPPER CAR
Robert C. Collins, East Orange, and Constantine A. Michalos, Fort Lee, N.J., assignors to ACF Industries, Incorporated, New York, N.Y., a corporation of New Jersey
Filed Aug. 29, 1960, Ser. No. 52,664
7 Claims. (Cl. 302—52)

This invention relates to a hopper car, and more particularly to hopper car pneumatic lading conveyor apparatus.

In pneumatic conveyors presently available, for removing lading in bulk from hopper cars, the structures are complex, expensive, costly to operate or maintain and some need a substantial number of moving parts that are subject to possible mechanical failure. In addition, these pneumatic conveyors are unsatisfactory since they are not readily adaptable for conveying different sized granular products at different speeds.

It is the purpose of this invention to provide a simple versatile pneumatic conveyor, readily adjustable for different sized granular lading that is shipped in bulk, has no moving parts in the actual process of conveying the lading and can convey lading at different speeds.

An object of this invention is to provide a pneumatic conveyor for granular lading shipped in bulk, having a minimum number of parts, that is so constructed that it may be easily and completely assembled and disassembled.

Another object of this invention is to provide a simple pneumatic conveyor device for conveying finely divided material without the aid of any moving parts.

A further object of this invention is to provide a pneumatic conveyor that is versatile in its adaptability to convey different particle size lading shipped in bulk.

Another object of this invention is to provide a more simplified apparatus for conveying lading in bulk which is capable of a high conveying speed and greater uniformity of operation.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

FIGURE 1 is a perspective view of a hopper car with a conveying apparatus in accordance with a preferred embodiment of the invention;

FIGURE 2 is a side view partly in section of the conveying apparatus shown in FIGURE 1;

FIGURE 3 is a sectional view only of a dividing plate extending through a conveyor tube, taken on line 3—3 of FIGURE 2;

FIGURE 4 is a sectional view like FIGURE 3 taken on line 4—4 of FIGURE 2;

FIGURE 5 is a sectional view like FIGURE 3 taken on line 5—5 of FIGURE 2;

FIGURE 9 is a sectional view of the apparatus as shown in FIGURE 6 but with the valve in wide open position;

FIGURE 10 is a sectional view as shown in FIGURE 7, but with some of the parts redisposed to show the two positions of the operating means when the valve is fully opened;

FIGURE 11 is a side view partly in section of a portion of the apparatus showing a nozzle attachment on one end of the conveyor tube taken on line 11—11 of FIGURE 12;

FIGURE 12 is an end view of the nozzle attachment as shown in FIGURE 11;

FIGURE 13 is a fragmentary sectional view taken on line 13—13 of FIGURE 11;

Figure 6:
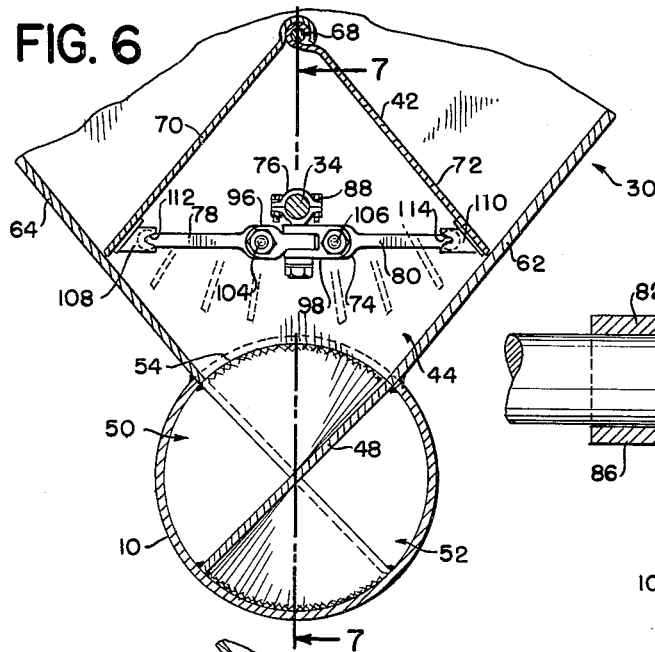
FIGURE 6 is a sectional view showing a valve and a valve operating means taken on line 6—6 of FIGURE 2.

In carrying the invention into effect in the embodiment which has been selected for illustration in the accompanying drawings and for description in this specification and referring now particularly to FIGURES 1 to 5, an adjustable pneumatic conveyor apparatus such as an elongated conduit or pneumatic conveyor tube 10 extends transverse to a receptacle such as a hopper car 12 and is supported beneath a plurality of chutes such as a pair of transversely spaced side hoppers 14 by a bolt and flange arrangement 16. The hoppers 14 are arranged in transverse pairs along the hopper car 12 and each pair is in communication with, and supports one conveyor tube 10. The car 12 is of the covered hopper car body type supported by a pair of four-wheel trucks and having a coupler attached at its outer ends.

A removable means for selectively withdrawing lading by suction from either end of the conveyor tube 10 such as a nozzle 18, is shown attached to one end of the conveyor tube 10. A second removable means is provided for selectively admitting air to the end of the tube opposite that from which lading is withdrawn. This may be in the form of a filter unit 20 through which metered conveying air is drawn into the conveyor tube and is shown attached to the end of the conveyor tube 10. The nozzle 18 and the filter 20 are held in place against the ends of the conveyor tube 10 by suitable latch or clamping means 22 and are interchangeable one with the other. These filter and nozzle means being interchangeable permit unloading from either side of the car and also retention at the unloading stations. The hoppers carrying the tube 10 with the filter 20 and the nozzle 18 as shown in FIGURE 1 are ready to be unloaded. On the outlet portion of the nozzle 18 is shown a pneumatic tube, which is connected to a suction or low pressure source, for the propelling of lading from the hoppers 14, through the conveyor apparatus, to the storage bins (not shown).

The other pairs of hoppers in FIG. 1 are shown with their conveyor tubes 10 closed on each end by dust or cover plates 24. This is the condition in which the car is shipped with the nozzles and filters being carried in a box on the car or retained at the unloading station for use on various cars. The cover plates 24 are each secured to and cap the ends of the tubes 10 by the same clamping means 22 that are used to hold the nozzle 18 and the filter 20 on the ends of the tube. The plates or caps 24 are protected from being lost, when removed, by chains 26 attached to the clamping means 22 by brackets 28. The cover plates 24 protect the edges of the conveyor tubes 10 and in addition they keep the inside of the conveyor tubes and the lading free from contamination.

Interposed between the tube 10 and the hoppers 14 are upper lading receiving chambers or spaces 30 and 32 located below the discharge openings of the hoppers 14. An actuator or operating rod 34 extends transverse of the hopper car 12 and through these chambers 30 and 32, and is rotatably and slidably mounted therein. Handles 36 and 38 are rigidly attached to the ends of rod 34 on either side of the hopper car and near the end portions of the conveyor tube 10. The handles 36 and 38 can be used to rotate the rod and in addition to pull or push the rod 34 transversely within the chambers 30 and 32. The rod 34 can be locked in position by inserting the handles 36 and 38 in any pair of spring clips 40, located on the outside surface of both end portions of the tube 10. In this respect the rod 34 can be moved laterally of the car and be locked in position in incremental steps. The rod 34 is part of an operating or actuating means for a valve or door means 42, (FIG. 6), which can open, close or control the size of chamber passages 44 and 46, formed in the upper chambers 30 and 32. The size of the chamber passages 44 and 46 are controlled depending on the size of the lading to be conveyed. In addition, the rod 34 operates the door means 42 to control the amount or rate of flow of the granular material conveyed, as hereinafter more fully described.

An angularly displaced dividing center plate 48 extends longitudinally along each conveyor tube dividing the tube 10 into two separate material carrying pneumatic conveyor paths 50 and 52. The plate 48 is angularly disposed and longitudinally twisted, as shown in FIGS. 2 to 5 to provide two end portions joined by an inermediate twisted or transitional portion. A relatively large upper part of the tube 10 is partially removed adjacent each end to define with the plate 48 longitudinally extending rectangular arcuate lading tube passages 54 and 56 having transverse dimensions greater than half the tube diameter and adapted to communicate with each of the pneumatic paths 50 and 52 from the hoppers 14 through the chamber passages 44 and 46. That is, the plate 48 has one end portion that extends flat at a 45 degree angle at one end of the tube 10, from section 3—3 of FIG. 2, up to an end wall 58 of the upper chamber 30 to present the pneumatic path 50 to one hopper. In this position the end portion forms substantially a continuation of hopper plate 62 as best seen in FIGS. 6 and 9. Starting at the end wall 58, the dividing plate 48 starts twisting about its longitudinal axis, as shown in FIGURES 2, 4 and 5, transitionally rotating or twisting substantially 90 degrees counter clockwise as viewed from the left hand end of FIGURE 2 up to an end wall 60 of the upper chamber 32. The longitudinal twist in the intermediate portion will be through an angle substantially equal to the included angle between hopper sheets 62 and 64. Then, from this end wall 60 the plate 48 extends flat to form the second end portion at substantially a 45 degree angle to the other end portion of the tube 10 as shown by FIG. 5, to present the pneumatic path 52 to the other hopper. In this position the last referred to end portion will in effect form a continuation of hopper sheet 64 and different surfaces of plate 48 will be uppermost in different hoppers.

Referring to FIGURES 6 to 10, the upper edge of the flat section of the dividing plate 48 is shown connected to and forming a continuation of the lower edge of a sloping side wall 62 of the upper chamber 30. The sloping side wall 62, opposed sloping side wall 64, the end wall 58 and another end wall 66, (FIGS. 2, 7), are welded to the tube 10 to form the rectangular arcuate passage 54, as hereinbefore described. The chamber 30 therefore, as shown, is in communication with the pneumatic path 50 through the passage 54.

Figure 8:
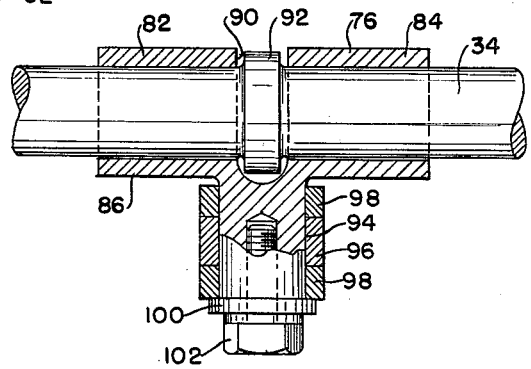
FIGURE 8 is an enlarged fragmentary sectional view of a portion of the operating means as shown in FIGURE 7.
Figure 7:
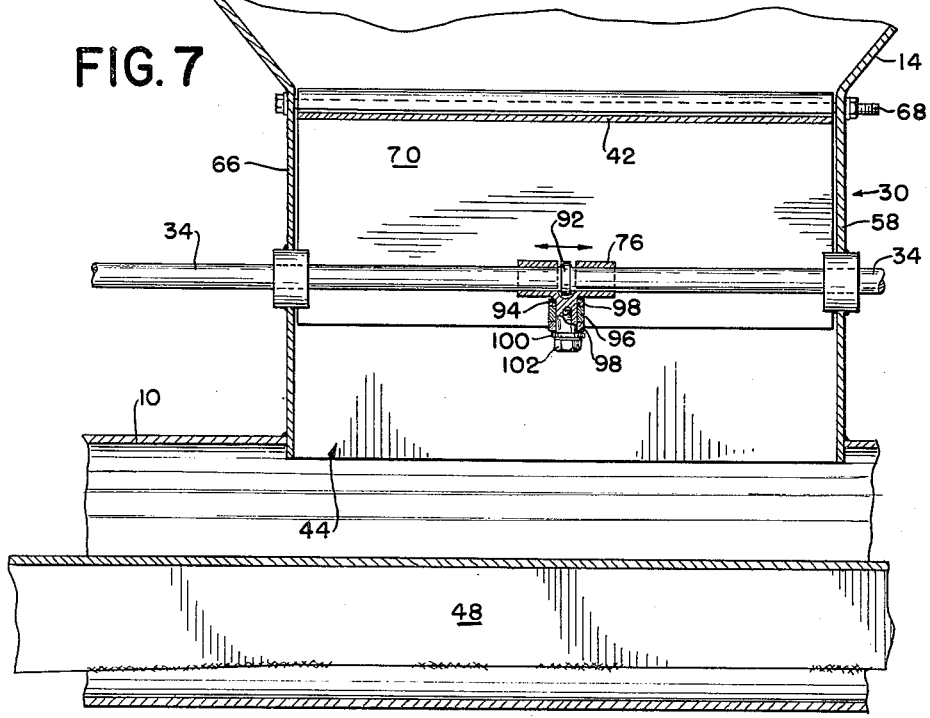
FIGURE 7 is a sectional view taken on line 7—7 of FIGURE 6.

Within chamber 30, hinged on a pivot rod 68 is located the valve or door means 42 comprising two doors 70 and 72, which are adapted to control the size opening of the passage 44 between the hopper 14 and the pneumatic path 50. In addition, the doors are used to completely close off the hopper from the pneumatic path 50, as shown in FIGURE 6, to avoid the lading from packing in the tubes 10 during transit. A door operating or actuating means 74, mainly comprises the rod 34 which is adaptable to rotate, as best shown in FIGURE 8, and move through the upper chamber 30 transverse to the hopper car as hereinbefore described. A bushing 76 made up of two identical parts 82 and 84 supported and bolted on a third part 86 by suitable bolt and nut means 88 surrounds rod 34, leaving an angular slot 90. The rod 34 has an enlarged diameter section 92, which fits between the identical part 82 and 84 and above part 86 in the slot 90. In this way, the rod 34 can move the bushing 76 longitudinally of the chamber and still be free to rotate without effecting location of the bushing.

Extending downwardly from the bushing 76 is a boss 94, on which is mounted horizontally rotatable brackets 96 and 98, held on the boss 94 by a washer 100 and bolt 102. Extending from brackets 96 and 98 are the actuator links 78 and 80 that can pivot vertically about suitable pivot pins 104 and 106. The compound movement of brackets 96 and 98 around the boss 94 with the links 78 and 80 around pins 104 and 106, form a universal arrangement. The other ends of the links 78 and 80 are connected to brackets 108 and 110 through universal joints 112 and 114. In this way, the actuator means 74 through the rod 34 may completely open and completely close the doors 70 and 72, as shown in FIGURE 6, by moving the rod 34 transverse to the hopper car 12. In addition, the rod 34 may be moved to open the doors to any intermediate position, as shown in phantom in FIGURE 6. Preferably, the links 78 and 80 are perpendicular to rod 34 when the doors are closed thereby relieving the rod of any thrust during transit of the car. The doors 70 and 72 are fully opened, as shown in FIGURE 9, when the bushing 76 is located, as shown in FIGURE 10, both in solid line and in phantom. In this respect, the doors may be fully opened from either end of the car by either pulling the rod 34 by one of the handles towards the operator until the handle can be inserted in the extreme pair of clips 40 nearest the operator, or by pushing the rod 34 away from the operator until the handle can be inserted in the extreme pair of clips 40 furthest from the operator. The rod 34 and in turn the doors 70 and 72 can be locked or held in the fully opened position by the insertion of the handles 36 or 38 to either of the extreme pair of clips 40.

To completely open, close or control the doors, the handles are released from the clips 40, by being rotated to clear the clips and then pushed or pulled, depending on the location of the handle held by the operator, to move the rod 34, then rotating the rod to engage the desired clip and lock the handle between them. The doors 70 and 72 are securely held in closed position by links 78 and 80 being in alignment and any load on one door is transmitted to the other door through the extending links 78 and 80, as shown in FIGURE 6. This secures the hoppers against any leaks of material that may fall from the hoppers 14 to the pneumatic tube 10 when the hopper car is in transit. It can be seen, the intermediate openings of the door may be had by locating and locking the handles 36 and 38 in any pair of intermediate clips 40.

The doors and actuator mechanism located in chamber 32 are identical with those in chamber 30 and operate simultaneously in the same way for the unloading of lading from the other hopper through its path 52. If desired, the control mechanism for the doors may be arranged to have each door operate independently whereby one hopper, of the pair of side hoppers, may be closed while emptying the other. This may be accomplished by the nozzle and filter unit combination of the present invention which can take care of emptying the hoppers one at a time, as hereinafter more fully described.

The only main difference between chamber 30 and 32 is that in chamber 30 one edge of the dividing plate 48 extends from the edge of the forward sloping side 62 of the chamber 30. In chamber 32, the same edge of the dividing plate 48 extends from the edge of the aft sloping side of the chamber 32, this due to the substantially 90 degree twist of the plate about its longitudinal axis between the hoppers. In this way, chamber 30 is in communication with path 50, while chamber 32 is in communication with path 52. Chamber 30 being completely closed off from the penumatic path 52 and chamber 32 being completely closed off from the pneumatic path 50. From the above, and from the FIGS. 2 to 5, it will be seen that the operator applying nozzle 18 to conduit 10 will know that the upper left half will discharge the nearest hopper and the lower right half will discharge the remote hopper.

Referring to FIGURES 11, 12 and 13, the nozzle 18 is shown inserted in one end portion 116 of the tube 10. The nozzle 18 comprises an angular annular seat portion 118, a ledge portion 120 and a groove 122. In addition, it comprises a circular outlet opening 124 at one end and a semi-circular inlet opening 126 at the other end. The inlet opening 126 takes up substantially half of the end portion of the nozzle with the other half 128 being blanked out. In this respect, the nozzle may close one pneumatic path of tube 10, while keeping the other open. As shown, in FIGURE 11, the angular annular seat portion 118 of the nozzle is seated on an angular annular seat 130 which is integral to the end portion 116 of the tube 10. The ledge portion 120 resting on the edge 132 of the dividing plate 48 closing off one pneumatic path, while keeping the other penumatic path open to unload only one hopper.

The nozzle 18 is retained in this position by the clamping means 22. The clamping means comprises a pair of bars 134 which pivot on a ring 136. Threaded on each bar 134 is a wing nut 138 which can be tightened on a pair of outwardly extending U-shaped lugs 140 integral with the nozzle 18. The ring 136 is clamped around the tube 10 by a bolt and nut arrangement 142. The ring 136 is prevented from moving laterally towards the edge 116 by an annular protrusion 144 integral to the surface of the tube 10, but it is free to rotate completely around the tube 10. In this respect, the nozzle 18 may be rotated to any desired location and then be clamped in the new location by tightening up on the wing nuts 138, hereinbefore described.

To close off one pneumatic path and open the other path, to unload the other hopper, the nozzle is released from its clamped position, rotated 180 degrees and clamped again. To open both pneumatic paths, the nozzle is released from its clamped position, rotated 90 degrees permitting the groove 122 to rest on the edge of the plate 48, and the nozzle clamped in this position. Since each of the pneumatic paths are in communication with a hopper, it is possible to unload both hoppers at the same time through the nozzle 18.

Figure 14:
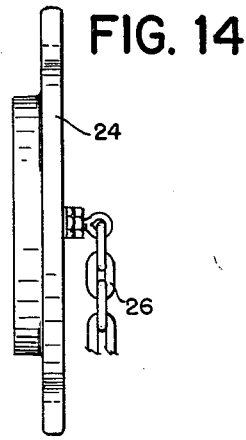
FIGURE 14 is a side view of an end cover plate for the conveyor tube.
Figure 15:
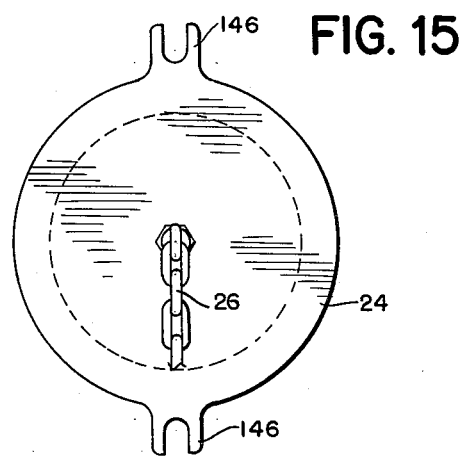
FIGURE 15 is a front view of FIGURE 14.

FIGURES 14 and 15 show the cover plate or cap 24. It can be seen that the cover plate 24 also has a pair of outwardly extending U-shaped lugs 146 that can receive the pair of bars 134 to clamp the covers on the edge of the tube 10 in the same manner as for the nozzle, as hereinbefore described.

Referring to FIGURES 16 to 19, the filter unit 20 is shown clamped on to the end 116 of the tube 10 again in the same manner as was the nozzle 18. The inner portion of the filter unit 20 has a seat 148, ledge 150 and groove 152 arrangement as the nozzle 18. This way, there is complete interchangeability of the nozzle 18 with the filter 20 on either end of the tube 10. That is, the nozzle 18 and the filter 20 can be reversed completely from one end of the tube 10 to the other end and the conveyor can operate to remove lading from either side of the hopper car 12.

The filter unit comprises a housing 154, in which is inserted a filter element 156, held in the housing 154 by a retaining member such as a collar nut 158, and a plate 160 freely rotatable on the surface of the collar nut 158. The housing 154 has a semi-circular opening 162 which takes up substantially half of the body portion of the housing. The other half of the housing 164 is blanked as in the nozzle 18. In this respect, the filter unit may close one pneumatic path while keeping the other open.

Figure 16:
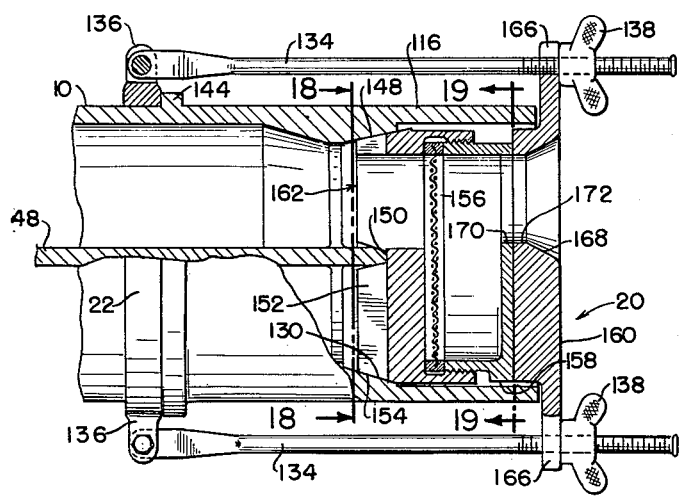
FIGURE 16 is a side view partly in section of a portion of the apparatus showing a filter attachment on one end of the conveyor tube taken on line 16—16 of FIGURE 17.
Figure 18:
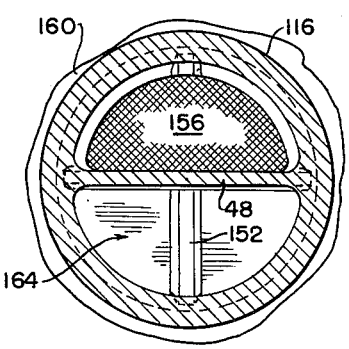
FIGURE 18 is a fragmentary sectional view taken on line 18—18 of FIGURE 16; and, FIGURE 19 is a fragmentary sectional view taken on line 19—19 of FIGURE 16.
Figure 17:
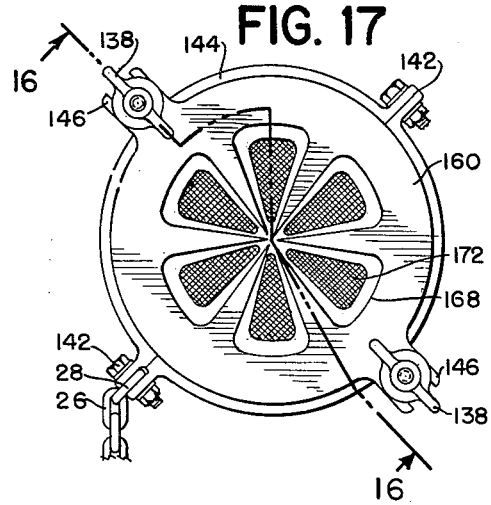
FIGURE 17 is an end view of the filter attachment as shown in FIGURE 16.
Figure 19:
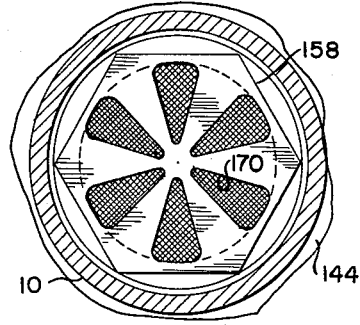

As shown in FIGURE 16, the plate 160 overlies the surface of the collar nut and is held in this position by means of the wing nuts 138 tightened on a pair of outwardly extending U-shaped lugs 166, integral to the plate 160. The plate has a plurality of nozzle openings 168 through which intake air may pass. Both the nut 158 and the plate 160 have the same daisy type air intake slots 170 and 172, each having the same size and configuration. (See FIGURES 17 and 19.) Rotating the plate 160 without rotating the nut 158 will control the size openings for different amounts of air intake to the conveyor apparatus and in this respect control the flow of air through the tube 10. The air intake can be adjusted in this manner like a damper to control the conveying air needed for different sized material or may be adjusted to control the speed of the material conveyed.

The operation of the invention is as follows: the hopper car 12 filled with lading will move into the unloading platform. To unload the hoppers 14, the cover plates 24 are removed from both ends of the tube 10 by loosening the wing nuts 138 and removing the rods 134. Next, the filter unit 20 is substituted for one cover plate at one end and the nozzle 18 is substituted for the other cover plate at the other end of the tube 10, on the side where the storage bins and the suction source is located (not shown). To unload one hopper, the filter unit 20 and the nozzle 18 are assembled on the ends of the tube 10 with the opening 162 of the filter 20 and the opening 126 of the nozzle 18 in communication with the desired pneumatic path such as 50. The filter unit is held in this position and the rotatable retaining ring 136 on which is hinged the two rods 134 is rotated until the rods 134 can be inserted in the U-shaped lugs 166 of the plate 160, after which the wing nuts 138 are tightened to hold the filter unit 20 on the end of the tube 10. The nozzle 18 is held on the other end of the tube 10 and the ring 136, on the nozzle side, is rotated until the rods 134 can be inserted in the nozzle U-shaped lugs 140, after which the wing nuts 138 are tightened to hold the nozzle on the end of the tube 10.

To control the air intake through the selected pneumatic path, the tension on rods 134 on the side of the filter unit 20 is released by the wing nuts 138. The plate 160 is then free to rotate in relation to the surface of the nut 158 to adjust the size of the inlet air opening by opening or closing off the air intake slots 170. The wing nuts 138 are then tightened to press the filter housing seat 148 against the tubes angular seat 130 and to press the ledge 150 against the edge of the plate 48, to seal one pneumatic path from the other. The size of the air intake slot openings depend on the size of the material to be conveyed or the speed at which the material is to be conveyed.

A handle 36 or 38, which can be reached from the side of the car where the operator is located, is released and rotated from its locked position on the clip 40. The rod 34 is pushed or pulled by the handle to open the doors 70 and 72 to set the size of the discharge openings of the passages 44 and 46. The desired passage size is set and the doors 70 and 72 located in position by inserting the handles in a suitable pair of clips 40. The size of the door opening depends on the size of the material to be conveyed or the speed at which the material is to be conveyed. The hopper communicating with the open pneumatic path is now ready to be unloaded.

A suitable source of suction is connected to the nozzle 18 and conveying air is drawn through the filter unit 20. The lading is therefore drawn from the hopper to the storage bins by the help of the air intake. After the one hopper is unloaded the filter unit 20 and the nozzle 18 are released sufficient to be rotated 180 degrees on their respective ends of the tube 10 thereby selecting a new path such as 52. The suction is started again to unload the other hopper.

If desired, to empty both hoppers at the same time, the filter and the nozzle are rotated 90 degrees and supported by their respective grooves 152 and 122 on the edges of the plate 48 within the tube 10. The suction source is then started to empty both hoppers at the same time. Due to the slight reduction of outlet areas through the nozzle 18, the area of the air intake at the filter end and the openings of the doors in the hoppers may have to be adjusted in size for proper conveying of the lading.

The invention hereinabove described may therefore be varied in construction within the scope of the claims, for the particular device selected to illustrate the invention is but one of many possible embodiments of the same. The inventon, therefore, is not to be restricted to the precise details of the structure shown and described.

What we claim is:

1. In a hopper car, the combination of, a car body, hoppers mounted in pairs on said car body, wheel assemblies adapted to run on railroad tracks and mounting the opposite ends of said car body to support said car body on the tracks, a single conveyor tube extending transversely of the car and mounted below a pair of hoppers and connected thereto, and a plate extending within said tube throughout the length thereof and dividing said tube into a pair of conveyor paths, said plate having the intermediate portion thereof twisted about its longitudinal axis to present one surface of the plate uppermost to form a part of one hopper of said pair of hoppers, and the other surface of the plate uppermost to form a part of the other hopper of said pair of hoppers, whereby one hopper of said pair may be unloaded at a time and from either end of the tube.

2. A hopper car having a plurality of hoppers adapted to be loaded with lading and with the hoppers arranged in pairs transverse to the length of said car, comprising, a conveyor tube extending below and connecting a transverse pair of hoppers, a plate dividing said tube into a pair of pneumatic paths, said plate having the intermediate portion thereof twisted about its longitudinal axis to present one path to each of said hoppers, the end portions of said plate additionally forming a part of said hoppers, and means attachable to said tube for selectively withdrawing lading from each hopper of said pair of hoppers by suction.

3. In a hopper car, a car body, spaced wheel assemblies mounting said car on railroad tracks, a pair of hoppers carried by said body between said wheel assemblies and adapted to be filled with lading, a pneumatic conveyor tube mounted below and secured to each hopper of said pair of hoppers, each hopper having an outlet connected to said tube, a plate coextensive with said tube and dividing said tube into a pair of pneumatic paths, said plate having an intermediate portion twisted about its longitudinal axis within said tube to present one path to each hopper outlet, the end portions of said plate additionally forming a part of said hoppers, a first means secured to one end of said tube for selectively withdrawing the lading from each hopper of said pair of hoppers through the selected path, and a second means for selectively admitting air to the selected path, said second means being secured on the end of the tube opposite said first means through which lading is withdrawn.

4. The combination with a plurality of hoppers arranged in pairs for the storage of lading and an adjustable pneumatic conveyor apparatus comprising a conveyor tube supported by one pair of hoppers, a plate dividing said tube into two separate pneumatic paths twisted about the longitudinal axis of the plate within the tube, such twisting presenting separate paths to each hopper and transposing the paths whereby a predetermined path position at either end of the tube will connect to the adjacent hopper, means for selectively withdrawing the lading from each of said hoppers through said separate transposed paths and means for admitting metered air to the end of said tube opposite to that from which the lading is withdrawn.

5. The combination with a receptacle for the storage of lading, a conveyor system, comprising, a conduit, a plurality of chutes each having a discharge opening adjacent and in communication with said conduit, plate means secured within said conduit and dividing said conduit into a plurality of conveyor paths, said plate having two surfaces and two end portions and an intermediate connecting portion, one of said end portions forming part of one chute and presenting one surface for the flow of lading thereover, the other of said end portions forming a part of the other chute and presenting the other surface of the plate for the flow of lading thereover, said intermediate portion being twisted about the plate longitudinal axis within said conduit to thereby present one conveying path individual to each of the said discharge openings of said chutes while closing off the communications between the other conveying paths and said discharge opening and suction means for selectively withdrawing lading from each of said chutes.

6. In a hopper car, a pneumatic conveyor system, comprising, a pair of spaced hoppers mounted transverse to the hopper car length, each hopper having a discharge opening, a conduit extending transversely of the car and having relatively large openings therein in direct communication with each of said dicharge openings, each of said relatively large openings having a transverse dimension substantially greater than half the transverse dimension of the conduit a plate positioned within said conduit and dividing said conduit into two separate pneumatic paths extending within said conduit and angualrly positioned one to the other to present the first pneumatic path to one discharge opening, said plate being twisted about its longitudinal axis between the hoppers to present the second pneumatic path to the second discharge opening and to maintain unimpeded said relatively large openings into the conduit.

7. The combination with a hopper car and a pneumatic conveyor system, comprising, a pair of hoppers adapted to contain lading and mounted transverse to said hopper car length, each of said hoppers having converging side walls forming a substantially rectangular opening, a lading receiving chamber extending downward from said rectangular opening and in communication with said hopper, a conduit extending transversely of the car and supported below two of said chambers, a plate substantially coextensive with the conduit and connected on one edge adjacent an end with one of the sloping side walls of one of said hoppers, said plate being twisted about its longitudinal axis and being connected along the same edge adjacent the other end thereof with the oppositely sloping side wall of the other hopper, thereby forming two separate pneumatic paths each in communication with one lading receiving chamber.

References Cited in the file of this patent

UNITED STATES PATENTS

| | | |
|---|---|---|
| 763,916 | Livingston | June 28, 1904 |
| 949,400 | McAfee | Feb. 15, 1910 |
| 2,030,553 | Tiley | Feb. 11, 1936 |
| 2,620,946 | Auer | Dec. 9, 1952 |
| 2,634,170 | Smith | Apr. 7, 1953 |
| 2,650,726 | Aller et al. | Sept. 1, 1953 |